US009003203B2

(12) United States Patent
Bursell

(10) Patent No.: US 9,003,203 B2
(45) Date of Patent: Apr. 7, 2015

(54) STORAGE ENCRYPTION

(71) Applicant: Citrix Systems, Inc., Fort Lauderdale, FL (US)

(72) Inventor: Michael Bursell, Halstead (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 22 days.

(21) Appl. No.: 13/748,032

(22) Filed: Jan. 23, 2013

(65) Prior Publication Data

US 2013/0191648 A1   Jul. 25, 2013

Related U.S. Application Data

(60) Provisional application No. 61/589,591, filed on Jan. 23, 2012.

(51) Int. Cl.
| | |
|---|---|
| G06F 12/14 | (2006.01) |
| H04L 9/08 | (2006.01) |
| G06F 9/48 | (2006.01) |
| G06F 21/62 | (2013.01) |
| G06F 3/06 | (2006.01) |

(52) U.S. Cl.
CPC .............. H04L 9/08 (2013.01); G06F 9/4856 (2013.01); G06F 21/6218 (2013.01); H04L 9/0894 (2013.01); G06F 3/0647 (2013.01); G06F 3/062 (2013.01)

(58) Field of Classification Search
CPC ............................... G06F 21/606; G06F 21/62
USPC .................................................. 713/189–194
See application file for complete search history.

(56) References Cited

U.S. PATENT DOCUMENTS

| | | | |
|---|---|---|---|
| 6,567,914 B1 * | 5/2003 | Just et al. ...................... 713/160 |
| 7,681,034 B1 | 3/2010 | Lee et al. | |
| 2008/0098154 A1 * | 4/2008 | Traut et al. ........................ 711/6 |
| 2008/0098217 A1 | 4/2008 | Pletka et al. | |
| 2008/0189432 A1 | 8/2008 | Abali et al. | |
| 2009/0125996 A1 * | 5/2009 | Guccione et al. .................. 726/6 |
| 2009/0169012 A1 * | 7/2009 | Smith et al. ................... 380/277 |
| 2009/0249073 A1 * | 10/2009 | Wiseman et al. ............. 713/171 |
| 2009/0328145 A1 * | 12/2009 | Berger et al. ..................... 726/3 |

(Continued)

OTHER PUBLICATIONS

Hirofuchi et al., Kagemusha: A Guest-Transparent Mobile IPv6 Mechanism for Wide-Area Live VM Migration, Network Operations and Management Symposium (NOMS), 2012 IEEE, pp. 1319-1326.*

(Continued)

*Primary Examiner* — Christopher Brown
*Assistant Examiner* — Roderick Tolentino
(74) *Attorney, Agent, or Firm* — Banner & Witcoff, Ltd.

(57) ABSTRACT

Storage associated with a virtual machine or other type of device may be migrated between locations (e.g., physical devices, network locations, etc.). To maintain the security of the storage, a system may manage the encryption of the storage area such that a storage area is encrypted with a first encryption key that may be maintained through the migration. A header of the storage area, on the other hand, may be encrypted using a second encryption key and the first encryption key may be stored therein. Upon transfer, the header may be re-encrypted to affect the transfer of security.

20 Claims, 10 Drawing Sheets

(56) References Cited

U.S. PATENT DOCUMENTS

| | | | |
|---|---|---|---|
| 2010/0023755 A1* | 1/2010 | Kotani et al. | 713/156 |
| 2010/0169948 A1 | 7/2010 | Budko et al. | |
| 2011/0085664 A1* | 4/2011 | Cross et al. | 380/277 |
| 2011/0202765 A1* | 8/2011 | McGrane et al. | 713/168 |
| 2011/0246766 A1* | 10/2011 | Orsini et al. | 713/160 |
| 2011/0252232 A1 | 10/2011 | De Atley et al. | |
| 2011/0289310 A1 | 11/2011 | Selgas et al. | |

OTHER PUBLICATIONS

Schmidt et al., Efficient Distribution of Virtual Machines for Cloud Computing, Parallel, Distributed and Network-Based Processing (PDP), 2010 18th Euromicro International Conference on, pp. 567-574.*

International Search Report and Written Opinion for PCT/US2013/022679 mailed May 7, 2013.

* cited by examiner

STORAGE ENCRYPTION

CROSS-REFERENCE TO RELATED APPLICATION

This application claims the benefit of priority from and is a non-provisional application of U.S. Provisional Application Ser. No. 61/589,591, entitled "STORAGE ENCRYPTION" and filed Jan. 23, 2012. The content of the aforementioned application is hereby incorporated by reference in its entirety.

BACKGROUND

Virtual machines may be migrated between different devices and/or hosts. Virtual machines may further be associated with storage repositories that are provisioned for use by those virtual machines. For security, the storage repositories may be encrypted using various encryption algorithms and protocols.

In some arrangements, a user or service provider or other entity may wish to migrate a virtual machine from one device to another. In such instances, the original device may still have access to the storage repository, for example, if the original host knows of the appropriate encryption keys or decryption codes. Accordingly, a system and method is needed to migrate virtual machines between devices while maintaining effective security controls and management of their associated storage repositories.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein provide a system and method for maintaining storage repository security when transferring the repository from one device another. In one example, the data storage system of the storage repository may be encrypted using a first key, K1, and K1 may be stored in a header of the storage repository. To control access to the data storage system, the storage repository key K1 may be encrypted using a second key, K2. Accordingly, access to the encrypted file system may thus be controlled by the encryption of the key K1, without having to replace, decrypt and re-encrypt the entire file system. When the virtual machine is to be migrated, a device may initially generate a transfer key and encrypt the storage key K1 with the transfer key. The virtual machine is then migrated to the new device along with the transfer key and the storage header section. The new device may then generate a new encryption key K3 (not known to the original device) for encrypting the storage repository key K1.

BRIEF DESCRIPTION OF THE DRAWINGS

Figure 1A:
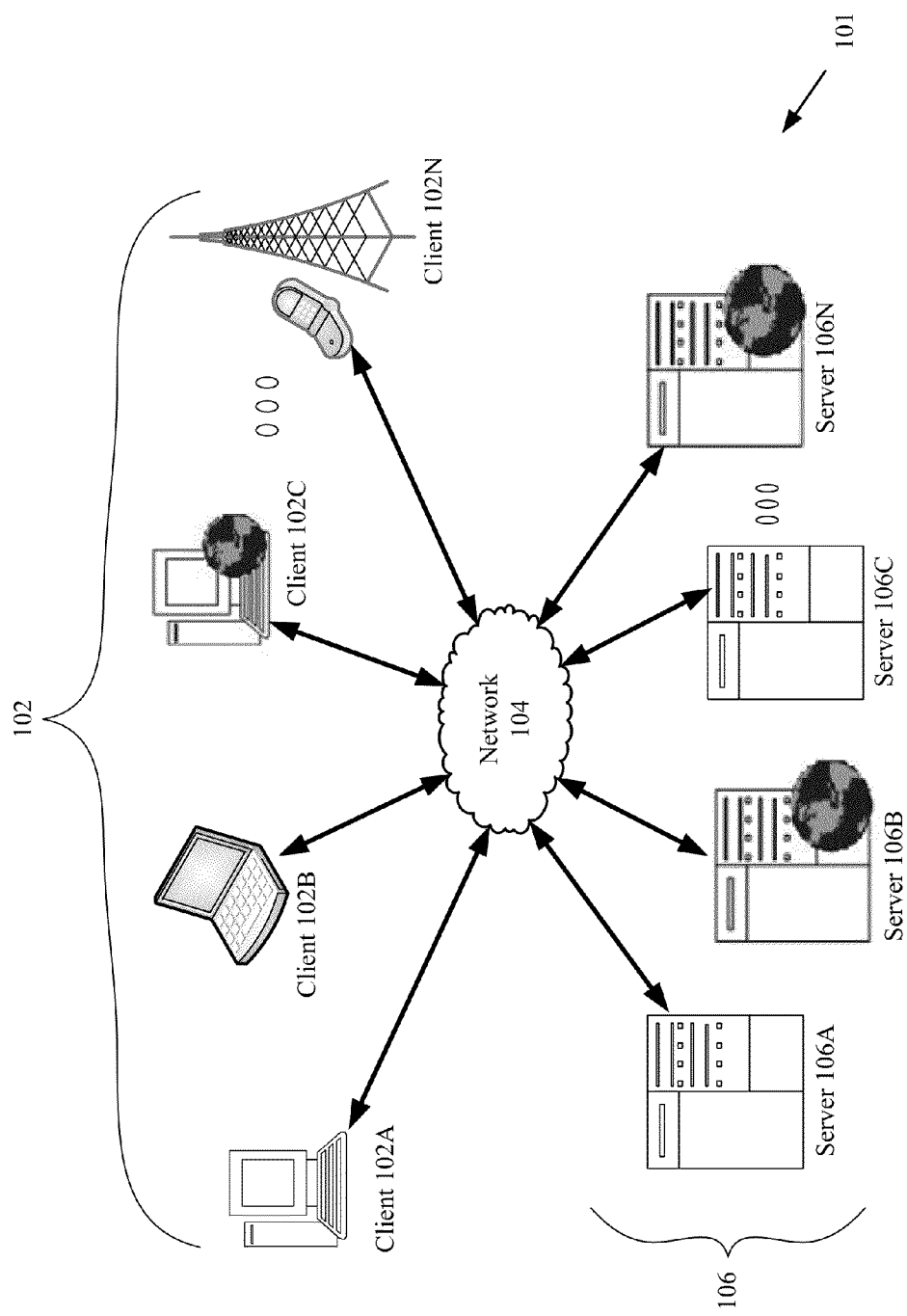

Having thus described aspects of the disclosure in general terms, reference will now be made to the accompanying drawings, which are not necessarily drawn to scale, and wherein:

FIG. 1A depicts embodiments of network environments that provide remote access to computing devices that can execute application programs.

Figure 1B:
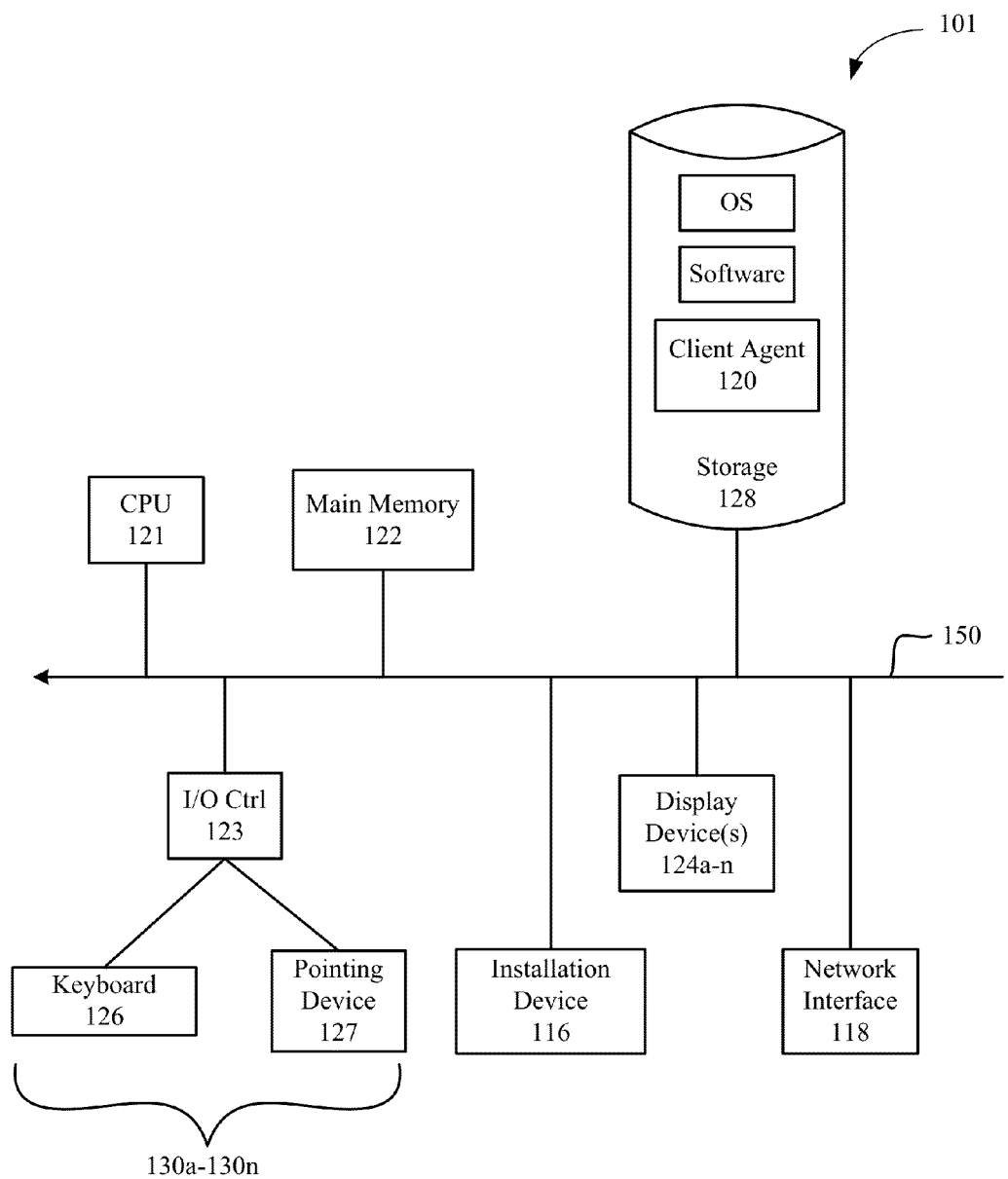
Figure 1C:
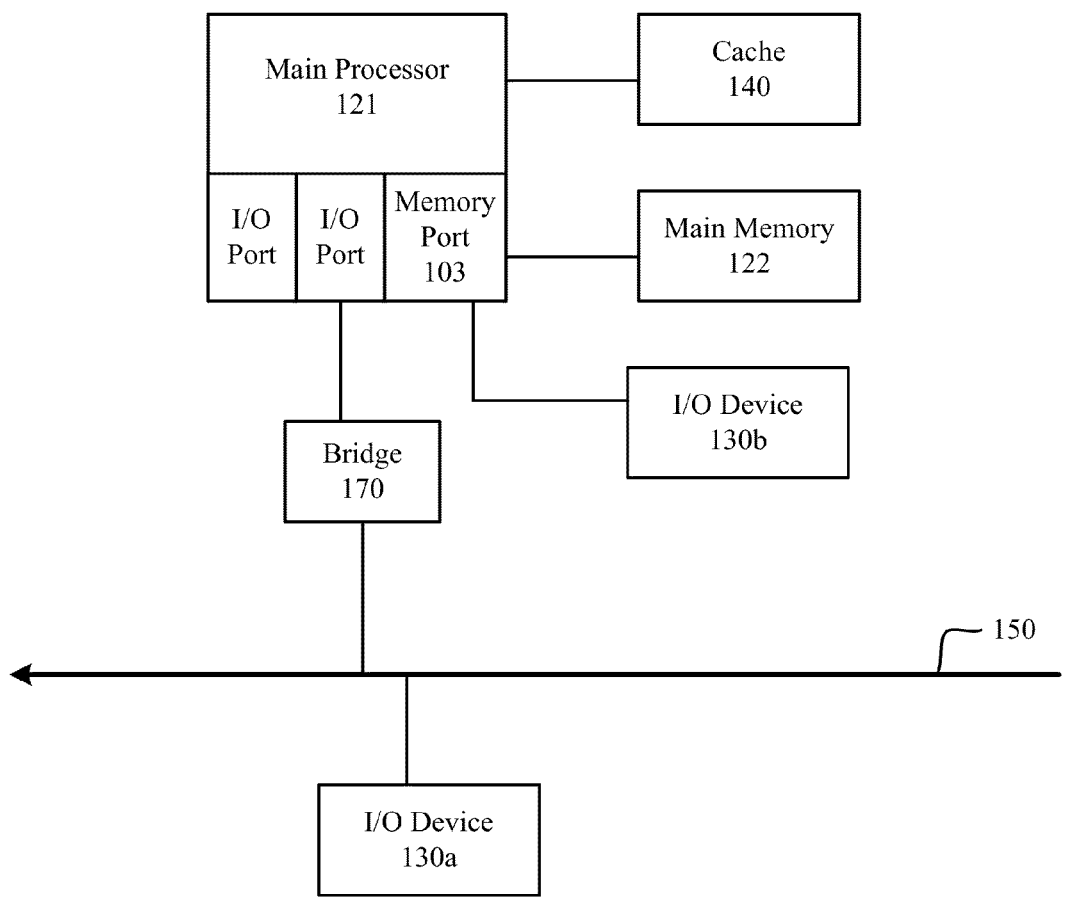

FIG. 1B and FIG. 1C are block diagrams that depict embodiments of computing devices.

Figure 2A:
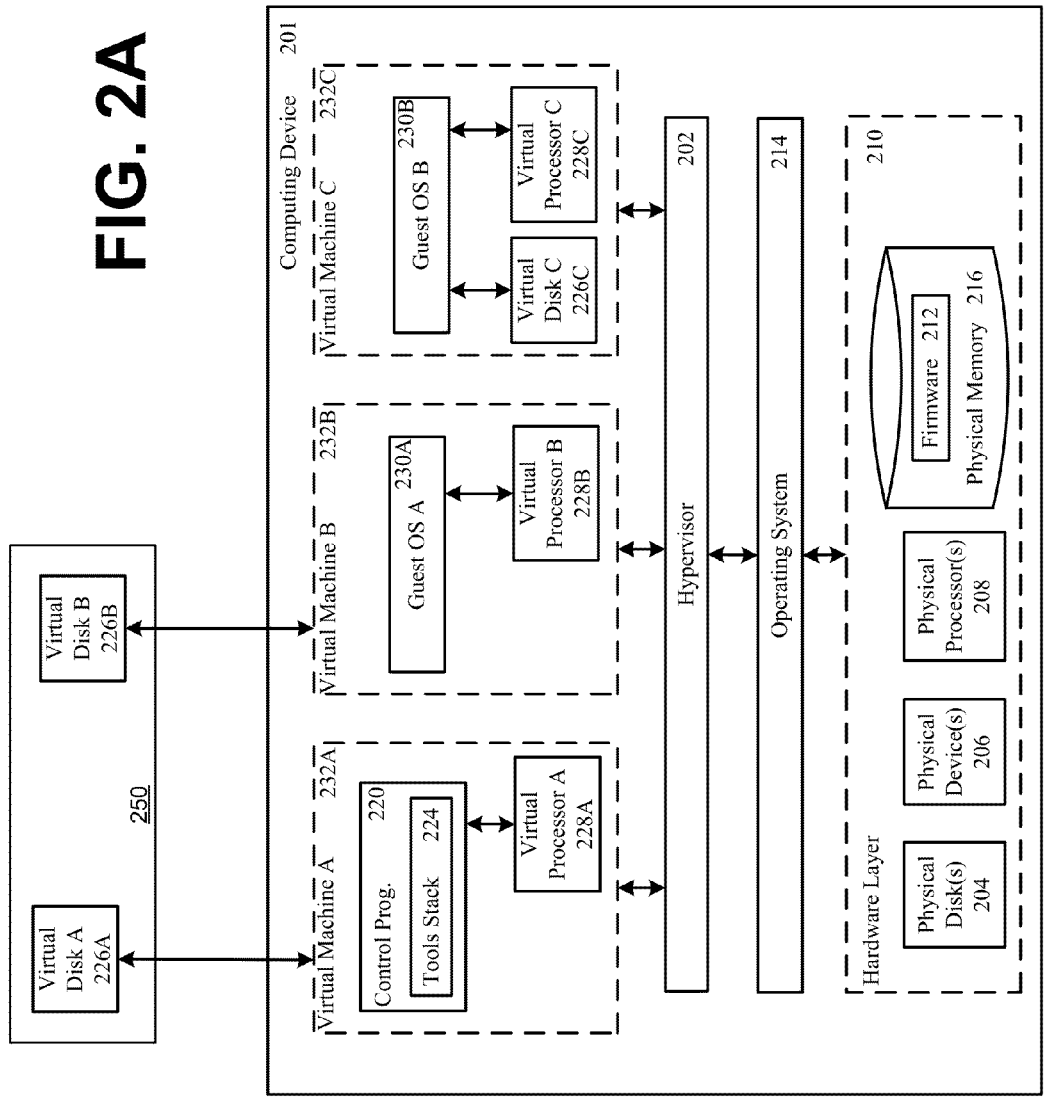
Figure 2B:
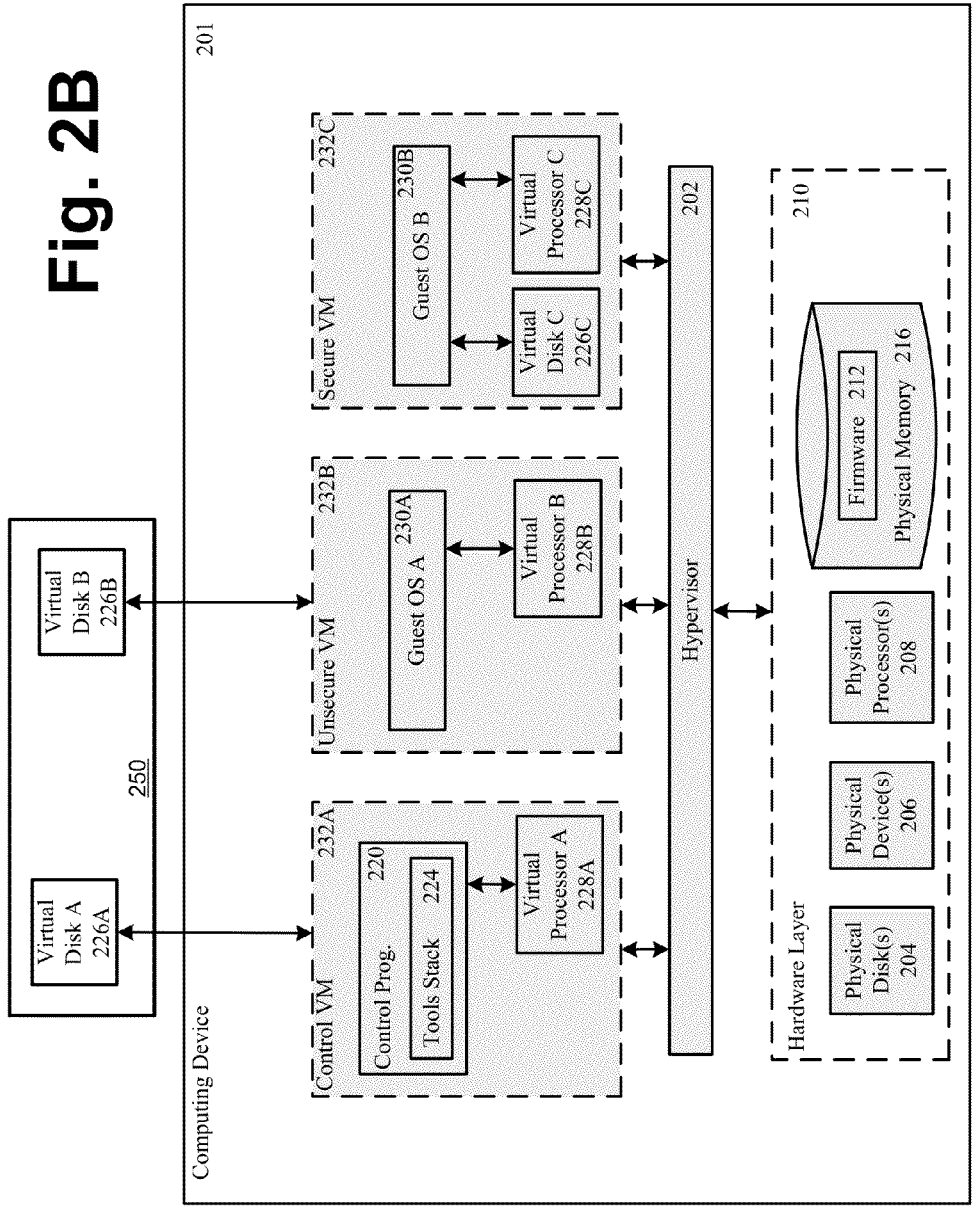

FIG. 2A and FIG. 2B are block diagrams that depict embodiments of a virtualization environment.

Figure 3:
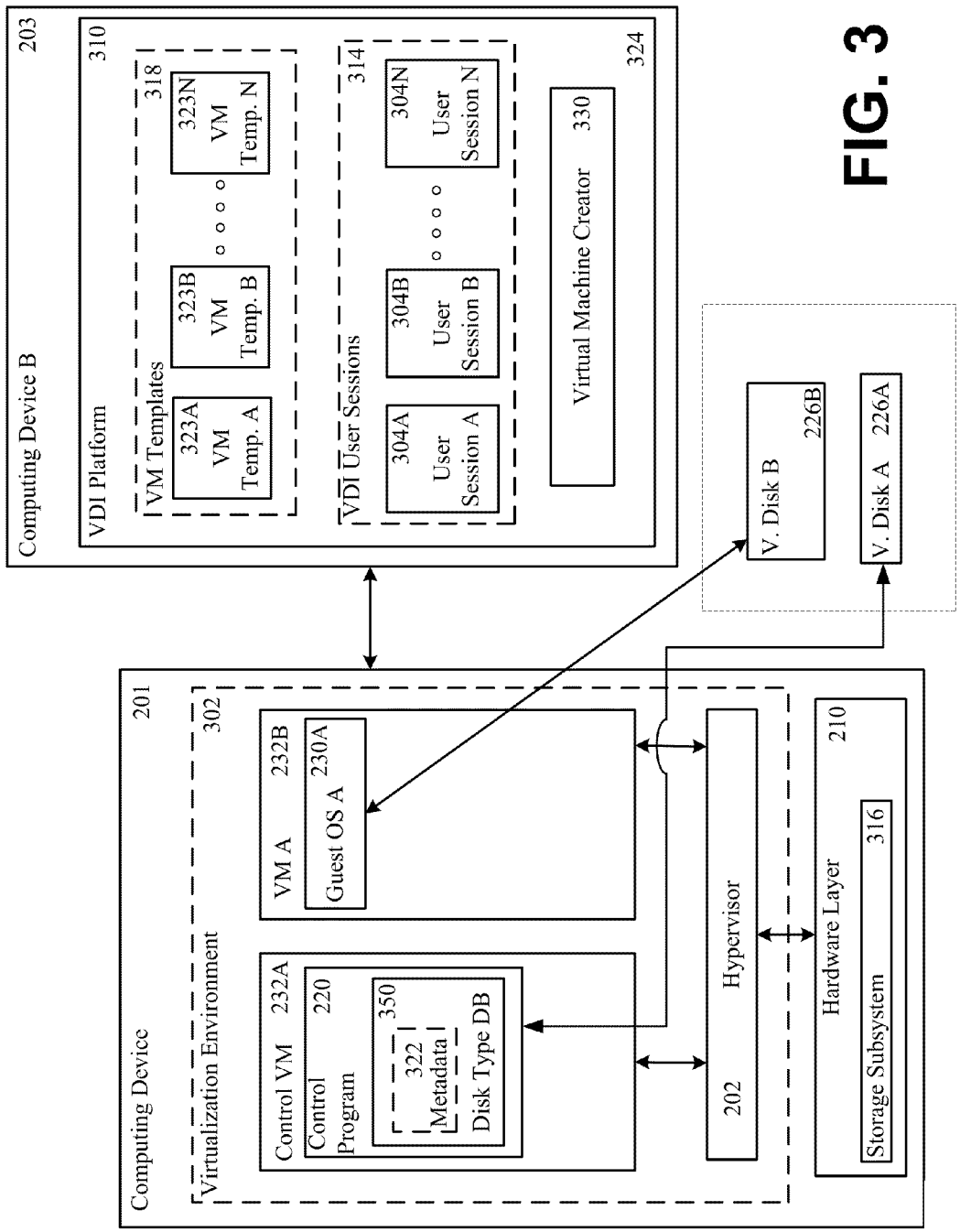

FIG. 3 is a block diagram that depicts embodiments of a virtualization environment and a virtual desktop infrastructure environment.

Figure 4:
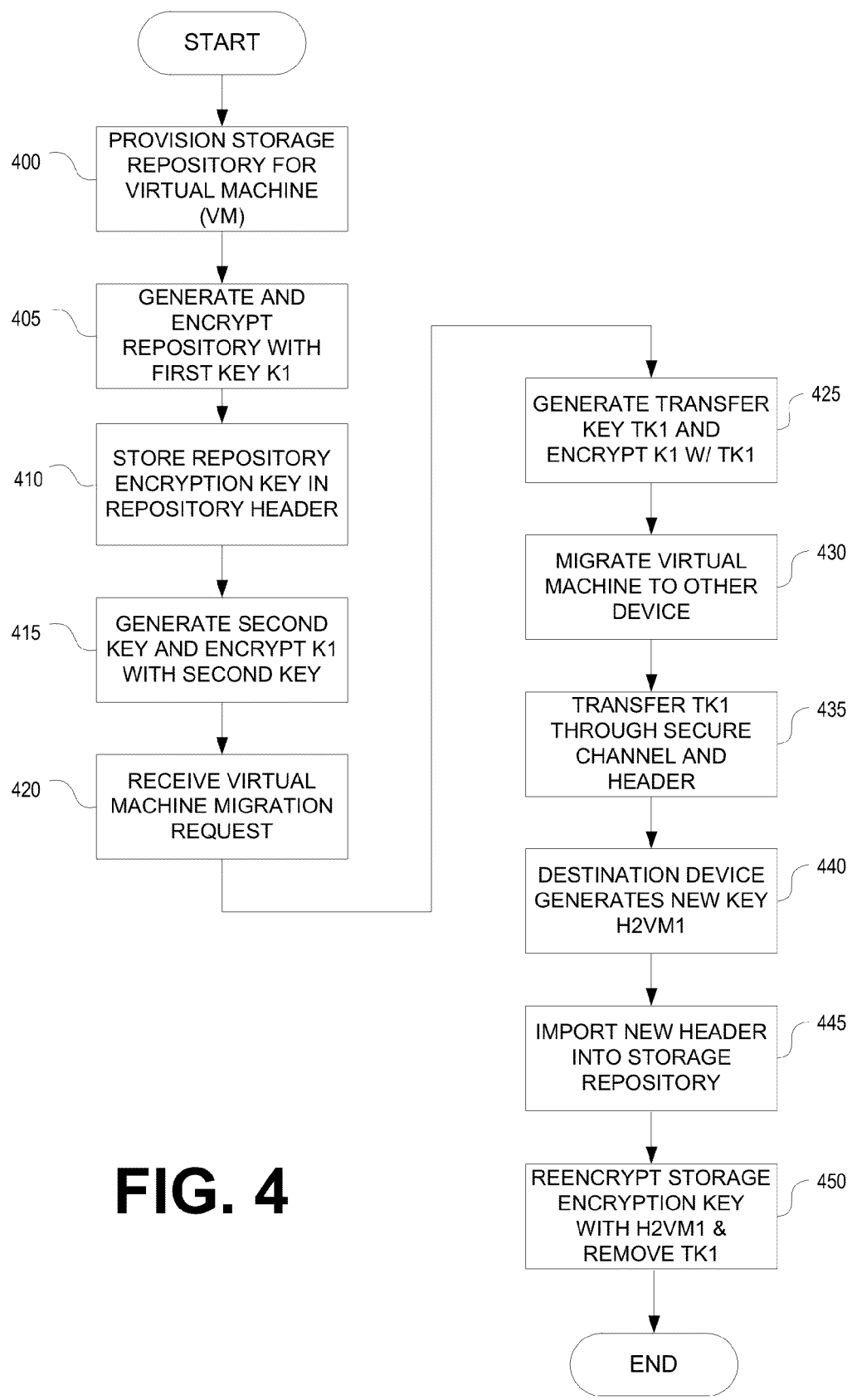

FIG. 4 is a flowchart illustrating an example process by which a virtual machine may be migrated from one device to another according to one or more aspects described herein.

Figure 5:
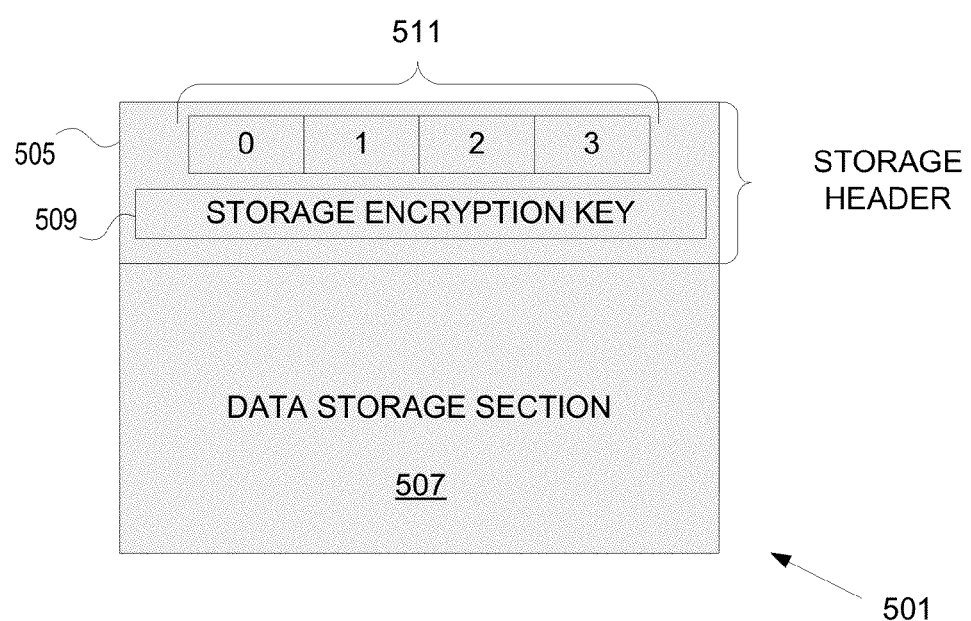

FIG. 5 illustrates an example block diagram illustrating a data storage repository structure according to one or more aspects described herein.

FIGS. 6A-6D illustrate a virtual machine migration process according to one or more aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C.

As illustrated in FIG. 2A, virtual disks are not limited to storage devices located in the same physical device as the devices on which the virtual machines are instantiated. Instead, the virtual disks such as virtual disk 226A and 226B may be provided or provisioned on a network storage site such as a cloud or network system 250 while virtual disk 226C may be physically included within device 201. Cloud systems may include an arrangement of various servers, switches, networks and storage along with a virtualization layer (e.g., hypervisors, special network virtualizations, storage virtualizations and the like). These elements may then be configured to provide various services including cloud storage, security systems, development environments, user interfaces and the like to users. The cloud may include private and/or public components. For example, a cloud may be configured as a private cloud to be used by one or more particular entities and/or via a private network while public clouds may be used by the general public over an open network. While virtual disks 226A and 226B are illustrated as being part of the same cloud 250, virtual disks 226A and 226B may also be provisioned in different clouds, servers or systems.

In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 provisioned for each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Illustrated in FIG. 3 is one embodiment of a system that includes a computing device 201 executing a virtualization environment 302 and a computing device 203 that executes a virtual desktop infrastructure (VDI) platform 310 and a performance monitoring system 316. The virtualization environment 302 executing on the computing device 201, can be any virtualization environment described herein. The illustrated embodiment depicts a virtualization environment 302 that includes a hypervisor 202, a control virtual machine 232A and one or more additional virtual machines 232B. The control virtual machine 232A can include a control program 220 communicating with a virtual disk 226A associated with metadata 322. The control program 220 can further include a disk type database 350 which can store the metadata 322 associated with the virtual disks 226 of the virtualization environment 302. The additional virtual machine(s) 232B can execute a guest operating system 230A that communicates with a virtual disk 226B associated with metadata 322. The computing device 201 can include a hardware layer 201 that interfaces with the hypervisor 202 and that includes a storage subsystem 316. The other computing device 203 can include a VDI platform 310 that can encompass a virtual machine template pool 318 of one or more virtual machine templates 323A-N (herein generally referred to as virtual machine template 323) and a group of VDI user sessions 314 that includes one or more user sessions 304A-N (herein generally referred to a user sessions 304.) The other computing device 203 can also execute a virtual machine creator 330.

Further referring to FIG. 3, and in more detail, in one embodiment each computing device 201, 203 can be any computing device 100 described herein. In some embodiments, the computing devices 201, 203 can be a server 106 or a client 102. The computing devices 201, 203 can be referred to a first computer, a second computer, a third computer, etc. Furthermore, the computing devices 201, 203 can communicate with one another over a network such as any network 104 described herein. In one embodiment one computing device 201 can be a remote computer 201, while the other computing device can be a local computer 203. As the computing devices 201, 203 can be any computing machine 100 described herein, so too the hardware layer 210 can be any hardware layer 210 described herein and can include any computer hardware described herein.

The virtualization environment 302 executing on the computing device 201, can be any virtualization environment described herein. In particular, the virtualization environment 302 can include any hypervisor configuration, or either the hypervisor configuration illustrated in FIG. 2A or the hypervisor configuration illustrated in FIG. 2B. In one embodiment, the hypervisor 202 included in the virtualization environment 302 can be any hypervisor 202, or any hypervisor 202 described herein.

Having described in FIGS. 1-3 various examples computing devices, computing environments, and certain software and functionality that may be included in such systems, it will be appreciated that other software and hardware may be used other than those which are identified above. In addition, the following paragraphs provide additional examples of various methods and systems relating to the migration of a virtual machine while preserving security of a storage repository provisioned to the virtual machine.

FIG. 4 is a flowchart illustrating an example method by which a virtual machine may be migrated between two devices, virtualization environments, or domains while preserving the security of an associated storage repository. In one example, the preservation of security may include preventing a previous device, host or domain (e.g., a transferor virtualization environment) from being able to access the encrypted storage once the associated virtual machine has been migrated to the new device. In step 400, a first device on which a virtual machine currently exists may provision a storage repository for the virtual machine. For example, provisioning a storage repository may include partitioning storage space on a server for a particular virtual machine and/or allocating storage space on a cloud. In some examples, one or multiple components within a cloud integration layer of a public or private cloud can provision a storage repository for the virtual machine, such as a control virtual machine instructing a hypervisor to provision storage and allocating that storage to the virtual machine. A cloud infrastructure platform, in some instances, can provision storage to a virtualization environment or domain prior to provisioning a storage repository to a particular virtual machine. In step 405, the first device may generate and encrypt the storage repository using a storage encryption key K1. The storage encryption key K1 may be generated based on any of various known encryption protocols such as AES, Triple Digital Encryption Standard (DES), and the like. The storage encryption key K1 may then be stored in a header section of the storage repository in step 410. In some examples, the header section of the storage repository may be logically separate from a remainder of the storage repository and thus, might not be encrypted by storage encryption key K1. Thus, the header may be separately accessed and/or encrypted from a data storage section of the repository.

In step 415, the first device may further generate a second key H1VM1 with which the storage encryption key K1 is subsequently encrypted. The second key H1VM1 may then be stored in a key storage area, as described in additional detail below. By encrypting the storage encryption key K1, access to the storage repository may be secured by controlling access to the storage encryption key K1. Accordingly, in order to access storage encryption key K1 to decrypt the data stored in the data repository, a system or user must have knowledge of second key H1VM1 (e.g., to decrypt the storage encryption key K1). The storage repository may then be decrypted using the decrypted storage encryption key. Using such a security mechanism, access controls for the storage repository may be modified without having to decrypt the entire storage repository with an old storage encryption key K1 and to subsequently re-encrypt the entire storage repository with a new storage encryption key. Instead, only the encryption key H1VM1 might be replaced to affect the access control modification without having to modify the underlying storage encryption key (e.g., key K1).

FIG. 5 illustrates an example block diagram of a storage repository structure. Storage repository 501 may include a storage header 505 and a data storage section 507. Data may be stored in section 507 while parameters, flags, metadata and the like may be stored in header section 505. Header section 505 may further include a storage encryption key 509 used to encrypt data storage section 507. As described, storage encryption key 509 maybe encrypted using one or more keys specified in a key storage area 511. Key storage area 511 may be included within header section 505. In one or more other examples, key storage 511 may be stored separately from the data storage repository 501. Key storage area 511 may include slots 0-3 that may be configured to store encryption keys used to encrypt the storage encryption key 509 thereby controlling overall access to storage repository 501. For example, modifying key slots of key storage 511 (e.g., storing keys thereto and removing keys therefrom) may be controlled using the encryption keys. While 4 key slots are illustrated in FIG. 5, the key storage area 511 may store fewer or more key slots as needed or necessary. Changes to header 505 and access to the storage repository 501 may be facilitated using application protocol interfaces (APIs). For example, new keys may be inserted into a slot of the key storage area 511 using an API using the new key as a parameter or input. Similarly, a key may be deleted from key storage area 511 using a deletion API specifying a slot from which the key is to be deleted. In another example, retrieving data from the storage section 507 by using a data retrieval API that requires a key corresponding to one or more of the keys stored in key storage 511 as a parameter.

Referring again to FIG. 4, the first device may receive a request to migrate the virtual machine associated with the storage repository to another device (e.g., a second device) in step 420. In response thereto, the first device may generate and use a transfer key TK1 to encrypt the storage encryption key K1 in step 425. Transfer key TK1 thus effectively replaces a previous encryption key, such as key H1VM1, as the key with which the storage encryption key is encrypted. For example, the first device may initially decrypt the storage encryption key using H1VM1 then re-encrypt the storage encryption key using TK1 without having to decrypt and re-encrypt an entire data storage area of the data repository. In some examples, the storage encryption key may be encrypted with the transfer key TK1 by creating a new instantiation of the storage encryption key and encrypting the new instantiation. The previous instantiation (encrypted using a previously encryption key) may then be deleted. The transfer key TK1 may then be stored in the key storage area in one of the slots and key H1VM1 may be deleted or otherwise removed from the key storage area. A transfer key TK1 may be used instead of H1VM1 for the migration of the virtual machine in the event H1VM1 is to be used again or is used for other encryption by the first device. Accordingly, the first device may wish to maintain the secrecy of H1VM1 and therefore, might not transfer H1VM1 to the migration destination device or even off of the first device. In step 430, the first device may initiate the migration of the virtual machine to the destination second device. Migration of the virtual machine may include saving a current state of the virtual machine and copying the state information from one device to the other and a recipient device instantiating a new virtual machine using the received state information.

The first device may further transmit transfer key TK1 through a secure communication channel to the second device in step 435 along with the header section of the storage repository. In some examples, the header and the transfer key may be transmitted in the same channel or in different channels. The secure channel through which the transfer key and/or the header is transmitted may be different from a channel through which one or more other communications or types of communications associated with the virtual machine migration is transmitted. Once the virtual machine has been migrated and the transfer key TK1 and the storage repository header received, the destination second device may, in step 440, generate a new key H2VM1 to replace the transfer key TK1. Additionally, in step 445, the second device may import the received header into the storage repository. The second device may then encrypt the storage encryption key K1 using H2VM1 within the imported header in step 450 using transfer key TK1. For example, the device may invoke a storage key encryption API using the transfer key TK1 and new key H2VM1 as inputs or parameters. The passing of TK1 in the storage key encryption API may evidence authorization to re-encrypt (or encrypt a new instantiation of) storage encryption key K1 using the new key. Additionally, the second device may remove key TK1 from the key storage area once the storage encryption key has been encrypted with the new key H2VM1 and store new key H2VM1 to the key storage area of the storage repository header. Using the foregoing process, the storage repository may be re-secured using a new key that is not known to the previous device, i.e., the first device, without requiring a complete decryption and re-encryption of the file system/storage repository.

Figure 6A:
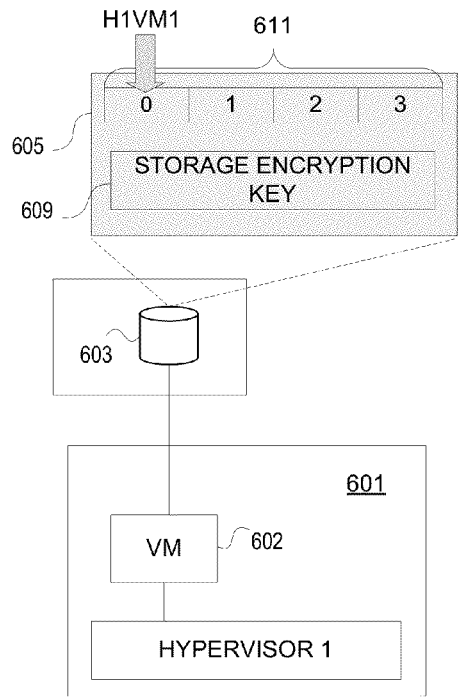

FIGS. 6A-6D illustrate a virtual machine migration process with corresponding structures and changes thereto. FIG. 6A illustrates, for example, computing device 601 providing virtual machine 603. Storage repository 603 may be provisioned for virtual machine 602 and may exist within a cloud system as discussed herein. In some instances, the storage repository 603 may be managed or otherwise regulated via a cloud infrastructure platform such as CLOUDSTACK or OPENSTACK. In other arrangements, a storage repository may be physically located within the same device (e.g., device 601). The device 601 may further encrypt storage repository 603 using a storage encryption key 609 stored to a header section 605 of the storage repository 603. Additionally, the device 601 may generate an encryption key H1VM1 for encrypting the storage encryption key 609 and store it to a slot, such as slot 0, of key storage area 611.

Figure 6B:
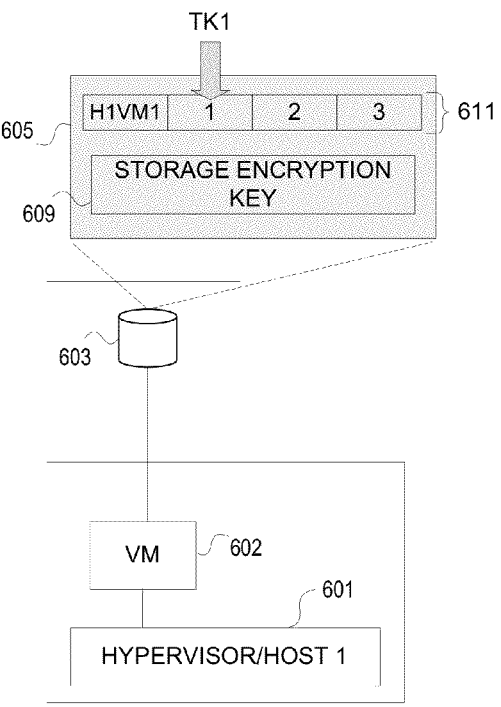

In FIG. 6B, upon receiving a request to migrate the virtual machine 602 to a new device, device 601 may generate a transfer key TK1 and store that transfer key into slot 1 of key storage area 611. The host 601 may further re-encrypt the storage encryption key 609 with TK1 and subsequently remove encryption key H1VM1 from slot 0. After the process of FIG. 6B, storage encryption key 609 will be encrypted with TK1 rather than H1VM1.

Figure 6C:
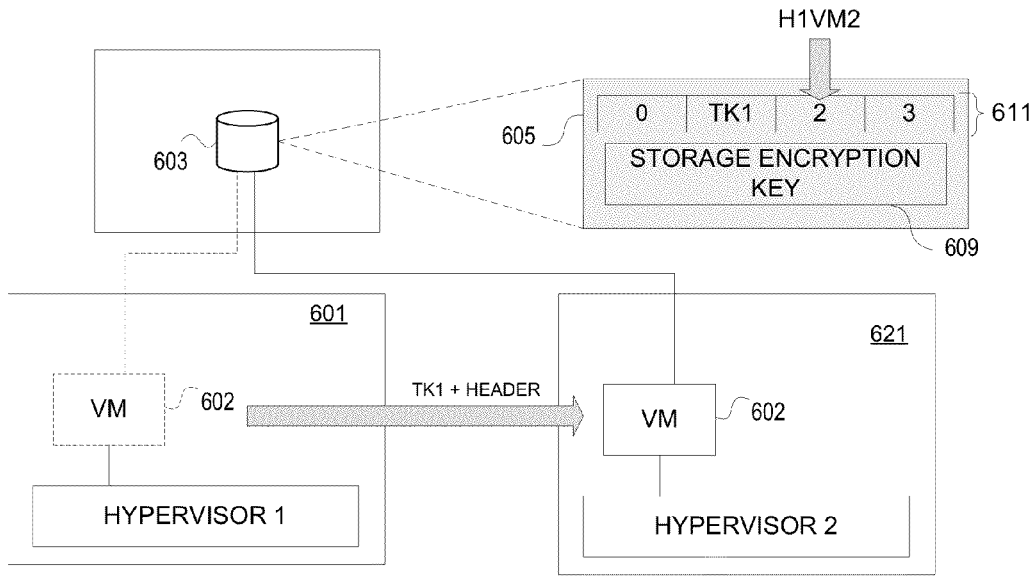

FIG. 6C illustrates the migration of virtual machine 602 from device 601 to device 621. As part of the migration, the transfer key TK1 may be transmitted to device 621 in a secure manner with or separately from a header section 605 of the storage repository 603. Once the virtual machine 602 has been migrated to device 621, device 621 may generate its own secret key H1VM2 for re-encrypting the storage encryption key 609 and may further store key H1VM2 to key storage area 611 (e.g., in slot 2). Similar to the process of replacing H1VM1 in FIG. 6B, device 621 may decrypt storage encryption key 609 with TK1 and re-encrypt the storage encryption key 609 with H1VM2. TK1 may then be deleted from key storage area 611.

Figure 6D:
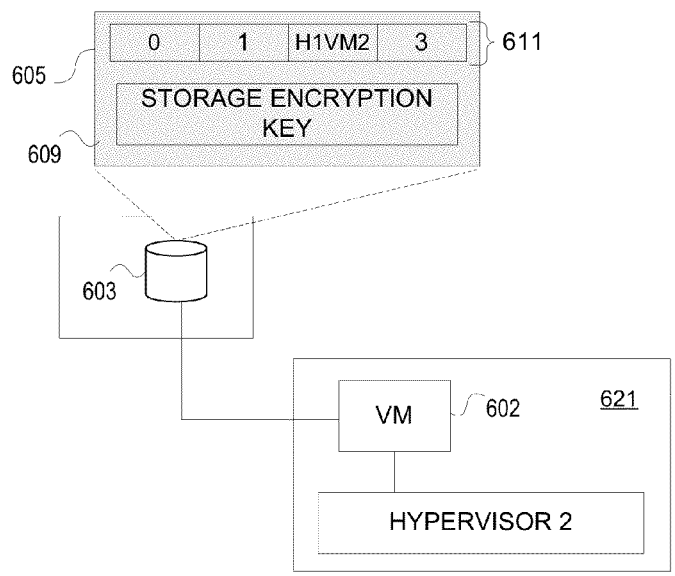

FIG. 6D illustrates a migrated virtual machine 602 and virtual machine 602 with the storage encryption key 609 newly encrypted with device 621's own key H1VM2, as shown in key storage area 611. Accordingly, without knowledge of H1VM2, the previous device, i.e., host 601, is likely unable to be able to access storage repository 603.

Although the subject matter has been described in language specific to structural features and/or methodological acts, it is to be understood that the subject matter defined herein is not necessarily limited to the specific features or acts described above. Rather, the specific features and acts described above are disclosed as illustrative forms.

What is claimed is:

1. One or more non-transitory computer-readable media storing instructions that when executed by one or more computers cause the one or more computers to:
encrypt, using a first key, data in a storage area of a virtualization environment, the storage area being provisioned for a virtual machine;
store, in a header of the storage area, the first key, the header being logically separated from the data;
encrypt, using a second key, the first key; and
responsive to a request to migrate the storage area from a first location of the virtualization environment to a second location of the virtualization environment:
decrypt, using the second key, the first key;
encrypt, using a third key, the first key;
migrate, from the first location and to the second location, the data, the data being encrypted in accordance with the first key;
decrypt, using the third key, the first key; and
encrypt, using a fourth key, the first key.

2. The one or more non-transitory computer-readable media of claim 1, wherein the instructions, when executed by the one or more computers, cause the one or more computers to encrypt, using the fourth key, the header, the header comprising the first key.

3. The one or more non-transitory computer-readable media of claim 1, wherein the instructions, when executed by the one or more computers, cause the one or more computers to store, in the header, the third key.

4. The one or more non-transitory computer-readable media of claim 3, wherein the instructions, when executed by the one or more computers, cause the one or more computers to remove, after encrypting the first key using the fourth key, the third key from the header.

5. The one or more non-transitory computer-readable media of claim 1, wherein the instructions, when executed by the one or more computers, cause the one or more computers to migrate, from the first location and to the second location, the data without modifying its encryption.

6. The one or more non-transitory computer-readable media of claim 1, wherein the instructions, when executed by the one or more computers, cause the one or more computers to migrate, from a first device of the virtualization environment and to a second device of the virtualization environment, the data.

7. The one or more non-transitory computer-readable media of claim 6, wherein the instructions, when executed by the one or more computers, cause the one or more computers to:
migrate, from the first device and to the second device, state information associated with the virtual machine;
instantiate, on the second device and based on the state information, a new virtual machine; and
provide the new virtual machine with access to the data.

8. A system, comprising:
a plurality of computing devices associated with a virtualization environment, the plurality comprising a first device comprising a storage area provisioned for a virtual machine, the storage area comprising data and a header logically separated from the data;
at least one processor; and
a memory storing instructions that when executed by the at least one processor cause the system to:
encrypt, using a first key, the data;
store, in the header, the first key;
encrypt, using a second key, the first key; and
responsive to a request to migrate the storage area from the first device to a second device of the plurality of computing devices associated with a virtualization environment:
decrypt, using the second key, the first key;
encrypt, using a third key, the first key;
migrate, from the first device and to the second device, the data, the data being encrypted in accordance with the first key;
decrypt, using the third key, the first key; and
encrypt, using a fourth key, the first key.

9. The system of claim 8, wherein the instructions, when executed by the at least one processor, cause the system to encrypt, using the fourth key, the header, the header comprising the first key.

10. The system of claim 8, wherein the instructions, when executed by the at least one processor, cause the system to store, in the header, the third key.

11. The system of claim 10, wherein the instructions, when executed by the at least one processor, cause the system to remove, after encrypting the first key using the fourth key, the third key from the header.

12. The system of claim 8, wherein the instructions, when executed by the at least one processor, cause the system to migrate, from the first device and to the second device, the data without modifying its encryption.

13. The system of claim 8, wherein the instructions, when executed by the at least one processor, cause the system to:
migrate, from the first device and to the second device, state information associated with the virtual machine; and
instantiate, on the second device and based on the state information, a new virtual machine.

14. The system of claim 13, wherein the instructions, when executed by the at least one processor, cause the system to:
decrypt, on the second device and using the fourth key, the first key;
decrypt, on the second device and using the first key, the data; and
provide, by the second device, the new virtual machine with access to the data.

15. A method, comprising:
encrypting, by one or more computing devices associated with a virtualization environment and using a first key, data in a storage area of the virtualization environment, the storage area being provisioned for a virtual machine;
storing, by the one or more computing devices and in a header of the storage area, the first key, the header being logically separated from the data;
encrypting, by the one or more computing devices and using a second key, the first key; and
responsive to receiving a request to migrate the storage area from a first location of the virtualization environment to a second location of the virtualization environment:
decrypting, by the one or more computing devices and using the second key, the first key;
encrypting, by the one or more computing devices and using a third key, the first key;
migrating, by the one or more computing devices, from the first location, and to the second location, the data, the data being encrypted in accordance with the first key;
decrypting, by the one or more computing devices and using the third key, the first key; and encrypting, by the one or more computing devices and using a fourth key, the first key.

16. The method of claim 15, comprising encrypting, by the one or more computing devices and using the fourth key, the header, the header comprising the first key.

17. The method of claim 15, comprising storing, by the one or more computing devices and in the header, the third key.

18. The method of claim 17, comprising removing, by the one or more computing devices and after encrypting the first key using the fourth key, the third key from the header.

19. The method of claim 15, wherein the virtualization environment comprises a first device and a second device, the method comprising:
   instantiating, by the first device, an instance of the virtual machine;
   providing, by the first device, the instance with access to the data;
   instantiating, by the second device, a different instance of the virtual machine; and
   providing, by the second device, the different instance with access to the data.

20. The method of claim 19, wherein providing the instance with access to the data comprises decrypting, using the second key, the first key, and decrypting, using the first key, the data, and wherein providing the different instance with access to the data comprises decrypting, using the fourth key, the first key, and decrypting, using the first key, the data.

* * * * *